Jan. 1, 1952    J. H. CRANKSHAW    2,581,173
BEARING ASSEMBLY
Filed Jan. 26, 1951
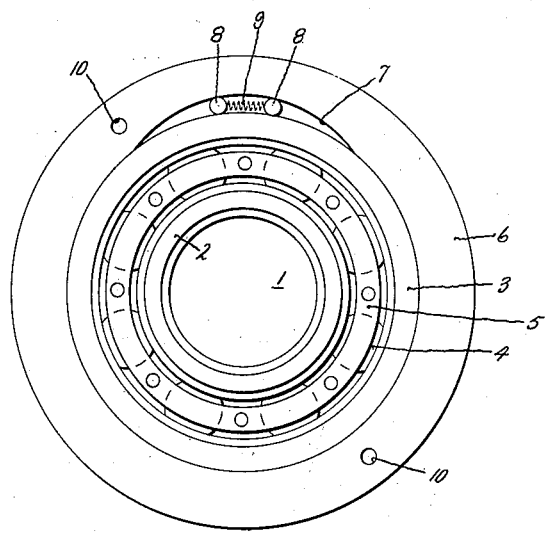
Inventor:
John H. Crankshaw,
by Ernest F. Britton
His Attorney.

Patented Jan. 1, 1952

2,581,173

UNITED STATES PATENT OFFICE 2,581,173

BEARING ASSEMBLY

John H. Crankshaw, Erie, Pa., assignor to General Electric Company, a corporation of New York Application January 26, 1951, Serial No. 207,964

5 Claims. (Cl. 308—236)

This invention relates to bearing assemblies and more particularly to bearing assemblies incorporating antifriction bearing.

In the design of two bearing apparatus, for example motors, it is necessary to provide for some axial freedom of the shaft in order to accommodate the accumulation of axial manufacturing tolerances and to allow for thermal expansion and contraction of the shaft and frame. This has been accomplished in practice by utilizing two ball bearings, one of which has its outer race clamped to the housing and the other of which is arranged for limited axial movement in its housing. In order to accommodate this axial movement, a particularly precise machining operation is necessary in order to have sufficient fit to support the bearing and prevent rotation of the outer race in the housing, and yet still permit the desired axial motion without excessive axial preloading. In the alternative, a ball bearing has been used at one end and a roller bearing at the other end of the machine in order to accommodate the axial movement of the shaft without the necessity for providing for axial movement of the outer race of the bearing while preventing the rotation thereof. Due to the higher costs of roller bearings, however, it is desirable to provide an arrangement utilizing a ball bearing in which the outer race is prevented from rotating within the housing and yet permitted to move axially, the manufacture of this assembly involving no more than ordinary tolerances.

An object of this invention is to provide an improved bearing assembly.

Another object of this invention is to provide an improved bearing assembly in which the outer race of an anti-friction bearing is prevented from rotating in the housing while axial movement is permitted.

A further object of this invention is to provide an improved bearing assembly characterized by the fact that the outer race of an anti-friction bearing is prevented from rotating within the bearing housing while axial movement is permitted, with ordinary tolerances being involved.

Further objects and advantages of this invention will become apparent and the invention will be better understood by reference to the following description and the accompanying drawing and the features of novelty which characterize this invention will be pointed out with particularity in the claims annexed to and forming a part of this specification.

In accordance with a preferred embodiment of this invention, a housing member is provided surrounding the outer race of an anti-friction bearing with a slip fit so that the bearing may move axially with respect to the housing. The housing has an eccentric recess formed in its inner surface facing the outer race, the outer boundary of the recess being an arc of such radius that the central portion thereof is spaced from the outer race by a greater distance than the ends of the recess. A pair of spaced apart rollers are arranged in the recess and a spring is arranged between the rollers to bias the rollers apart so that each roller engages the outer surface of the outer race and the inner surface of the recess. In this way, rotation of the outer race is prevented while axial movement is permitted thereby preventing preloading of the bearing.

The single figure of the drawing is a side elevational view of a bearing assembly incorporating this invention.

Referring now to the drawing, there is shown a bearing generally identified as 1 having an inner race 2 and an outer race 3 with a plurality of anti-friction elements 4 arranged therebetween and retained in position by a suitable retainer 5. The outer race 3 is mounted in a bearing housing 6 with a free or slip fit. The housing 6 has an eccentric recess 7 formed in its inner surface facing the outer surface of the outer race 3, the outer boundary of the recess 7 being an arc of such radius that the central portion of the recess 7 is spaced from the outer surface of the outer race 3 by a distance greater than the spacing at the ends of the recess. A pair of spaced apart rollers 8 are arranged in the recess 7 and are biased apart by a suitable spring 9. If there is no tendency for the outer race 3 to rotate in the housing 6, the rollers 8 merely rest lightly on the outer surface of the outer race 3. However, should the outer race 3 tend to move in either direction of rotation, one roller or the other will lock the outer race to the housing 6 since the spring 9 in urging the rollers 8 apart biases each of the rollers into engagement with the outer surface of the outer race 3 and inner surface of the recess 7. It will thus be readily apparent that this arrangement resists rotation of the outer race 3 within the housing 6, while imposing only light restriction to axial motion of the outer race in the housing and thus does not cause preloading of the bearing. It will be readily understood that the housing 6 is adapted to be secured in the frame of the machine, for example by mounting holes 10, or in the alternative may be an integral part of the machine frame structure.

It will be readily apparent that this construction provides positive action, the retarding torque of the rollers 8 being proportional to the torque tending to produce rotation of the outer race 3. This design does not increase the axial length of the bearing assembly and it will be readily apparent that the rollers 8 and the spring 9 can be mounted together in any number of ways, for example, in a simple clip device. Furthermore, the assembly and removal of the rollers 8 and spring 9 is simple and the roller and spring assembly can be installed after the bearing is in place. Furthermore, the device is effective regardless of the fit between the outer race 3 and the housing 6. It will also be readily understood that although the elements 8 are referred to as rollers, other wedging elements for example, balls may be utilized.

While I have shown and described a specific embodiment of this invention, further modifications and improvements will occur to those skilled in the art. I desire it to be understood, therefore, that this invention is not limited to the embodiments shown and I intend in the appended claims to cover all modifications which do not depart from the spirit and scope of this invention.

What I claim as new and desire to secure by Letters Patent of the United States is:

1. In a bearing assembly, an anti-friction bearing having inner and outer races with anti-friction bearing elements arranged therebetween, a housing member surrounding said outer race and having a recess formed in its inner surface facing said outer race, a pair of spaced apart wedging elements arranged in said recess, and resilient means for biasing said elements apart so that each of said elements engages the outer surface of said outer race and the inner surface of said recess whereby rotation of said outer race in said housing is prevented.

2. In a bearing assembly, an anti-friction bearing having inner and outer races with anti-friction bearing elements arranged therebetween, a housing member surrounding said outer race and having a slip fit therewith whereby said bearing may move axially with respect to said housing, said housing having a recess formed in its inner surface facing said outer race, a pair of spaced apart wedging elements arranged in said recess, and resilient means for biasing said elements apart so that each of said elements engages the outer surface of said outer race and the inner surface of said recess whereby rotation of said outer race in said housing is prevented while axial movement of said bearing in said housing is permitted.

3. In a bearing assembly, an anti-friction bearing having inner and outer races with anti-friction bearing elements arranged therebetween, a housing member surrounding said outer race and having a slip fit therewith whereby said bearing may move axially with respect to said housing, said housing having an eccentric recess formed in its inner surface facing said outer race, a pair of spaced apart rollers arranged in said recess, and resilient means for biasing said rollers apart so that each of said rollers engages the outer surface of said outer race and the inner surface of recess whereby rotation of said outer race in said housing is prevented while axial movement of said bearing in said housing is permitted.

4. In a bearing assembly, an anti-friction bearing having inner and outer races with anti-friction bearing elements arranged therebetween, a housing member surrounding said outer race and having a slip fit therewith whereby said bearing may move axially with respect to said housing, said housing having an eccentric recess formed in its inner surface facing said outer race, a pair of spaced apart rollers arranged in said recess, and a spring arranged between said rollers for biasing said rollers apart so that each of said rollers engages the outer surface of said outer race and the inner surface of said recess whereby rotation of said outer race in said housing is prevented while axial movement of said bearing in said housing is permitted.

5. In a bearing assembly, an anti-friction bearing having inner and outer races with anti-friction bearing elements arranged therebetween, a housing member surrounding said outer race and having a slip fit therewith whereby said bearing may move axially with respect to said housing, said housing having an eccentric recess formed in its inner surface facing said outer race, the outer boundary of said recess being an arc of such radius that the central portion of said recess is spaced from said outer race by a greater distance than the ends thereof, a pair of spaced apart rollers arranged in said recess, and a spring arranged between said rollers for biasing said rollers apart so that each of said roller engages the outer surface of said outer race and the inner surface of said recess whereby rotation of said outer race in said housing is prevented while axial movement of said bearing in said housing is permitted.

JOHN H. CRANKSHAW.

REFERENCES CITED

The following references are of record in the file of this patent:

UNITED STATES PATENTS

| Number | Name | Date |
|---|---|---|
| 880,255 | Vandergrift et al. | Feb. 25, 1908 |
| 1,220,185 | Cathcart | Mar. 27, 1917 |
| 1,788,891 | Runge | Jan. 13, 1931 |